(12) United States Patent
Xiang (10) Patent No.: US 9,806,975 B2
(45) Date of Patent: Oct. 31, 2017

(54) METHODS AND SYSTEMS FOR MANAGING CAPACITY IN A VIRTUALIZED NETWORK

(71) Applicant: Futurewei Technologies, Inc., Plano, TX (US)

(72) Inventor: Zhixian Xiang, Frisco, TX (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 366 days.

(21) Appl. No.: 14/735,030

(22) Filed: Jun. 9, 2015

(65) Prior Publication Data

US 2015/0365352 A1 Dec. 17, 2015

Related U.S. Application Data

(60) Provisional application No. 62/011,484, filed on Jun. 12, 2014.

(51) Int. Cl.
| | | |
|---|---|---|
| *H04L 29/08* | (2006.01) | |
| *H04L 12/26* | (2006.01) | |
| *H04L 12/24* | (2006.01) | |
| *G06F 9/50* | (2006.01) | |

(52) U.S. Cl.
CPC ........ *H04L 43/0888* (2013.01); *G06F 9/5077* (2013.01); *H04L 41/0806* (2013.01); *H04L 67/10* (2013.01)

(58) Field of Classification Search
CPC .... H04L 67/10; H04L 41/0896; G06F 9/5077
See application file for complete search history.

(56) References Cited

U.S. PATENT DOCUMENTS

2012/0324442 A1* 12/2012 Barde ................ H04L 49/70
  718/1
2014/0317261 A1* 10/2014 Shatzkamer ........... G06F 9/455
  709/223

FOREIGN PATENT DOCUMENTS

CN 103491129 A 1/2014

OTHER PUBLICATIONS

Chiosi, M., et al., "Network Operator Perspectives on Industry Progress," Network Functions Virtualisation (NFV)—Update White Paper, Issue 1, Oct. 15-17, 2013, 16 pages.
ETSI Industry Specification Group (ISG), "Network Functions Virtualisation (NFV); Virtualisation Requirements," ETSI GS NFV 004 V1.1.1, Oct. 31, 2013, 17 pages.
International Search Report, Application No. PCT/CN2015/081255, dated Sep. 9, 2015, 11 pages.
ETSI, "Network Functions Virtualisation (NFV); Use Cases," ETSI GS NFV 001, V1.1.1 (Oct. 2013), 50 pages.
ETSI, "Network Functions Virtualisation (NFV); Architectural Framework," ETSI GS NFV 002, v1.1.1, Oct. 2013, 21 pages.

(Continued)

*Primary Examiner* — Arvin Eskandarnia
(74) *Attorney, Agent, or Firm* — Slater Matsil, LLP (57) ABSTRACT

An embodiment of the disclosure includes a method including providing a network function virtualization (NFV) capacity for a plurality of virtual network functions (VNFs) on a computing platform. A network function virtualization management function creates at least one VNF to operate on the computing platform to perform a network function. Each of the VNFs has a definition comprising a plurality of parameters. At least one of the parameters is a capacity indication relative to a capacity of the network function for the respective VNF.

32 Claims, 5 Drawing Sheets

(56) References Cited

OTHER PUBLICATIONS

Scholler, et al., "Resilient deployment of virtual network functions," 2013 5th International Congress on Ultra Modern Telecommunications and Control Systems and Workshops (ICUMT), Sep. 1, 2013, 7 pages.

* cited by examiner

| Identifier | Type | Cardinality | Description | Example |
|---|---|---|---|---|
| vnf_reference  405 | Reference | 1 | Reference to a VNFD declared as vnfd in the Network Service | |
| vnf_flavour_id_reference | Reference | 1 | References a VNF flavour (vnfd:deployment_flavour:id) to be used for this service flavour, see | Active, standby |
| redundancy_model | Leaf | 0...1 | Represents the redundancy of instances, for example, "active" | |
| affinity  410 | Leaf | 0...1 | Specifies the placement policy between this instance and other instances, if any. | |
| capability | Leaf | 0...1 | Represents the capabilities of the VNF instances. An example of capability is instance capacity (e.g. capability = 50 %* NS capacity). | An example of capabitily is instance capacity (e.g. capacity = 50%*NS capacity |
| number_of_instances | Leaf | 1 | Number of VNF instances satisfying this service assurance. For a Gold flavour of the vEPC Network Service that needs to satisfy an assurance of 96K cps, 2 instances of the vMME VNFs will be required. | For a Gold flavor representing a vEPC service satisfying an assurance of 96K cps will require 2 instances of vMME, t instances of vSGW and 1 instance of vPGW |

FIG. 4    *PRIOR ART*

| Identifier | Type | Cardinality | Description | Example |
|---|---|---|---|---|
| vnf_reference 530 | Reference | 1 | Reference to a VNFD declared as vnfd in the Network Service via vnf:id. | |
| vnf_flavour_id_reference 532 | Reference | 1 | References a VNF flavour (vnfd:deployment_flavour:id) to be used for this service flavour, see clause 6.2.1.3.1. | |
| redundancy_model 534 | Leaf | 0...1 | Represents the redundancy of instances, for example, "active" or "standby". | Active, Standby |
| affinity 510 | Leaf | 0...1 | Specifies the placement policy between this instance and other instances, if any. | |
| Minimum capacity 520 | Leaf | 0...1 | Specifies the minimum capacity of the VNF instance | Instance minimum capacity = 10%*NS Capacity |
| Maximum capacity 536 | Leaf | 0...1 | Specifies the maximum capacity of the VNF instance | Instance minimum capacity = 50%*NS Capacity |
| number_of_instances | Leaf | 1 | Number of VNF instances satisfying this service assurance. For a Gold flavour of the vEPC Network Service that needs to satisfy an assurance of 96K cps, 2 instances of the vMME VNFs will be required. | For a Gold flavor representing a vEPC service satisfying an assurance of 96K cps will require 2 instances of vMME, t instances of vSGW and 1 instance of vPGW |

METHODS AND SYSTEMS FOR MANAGING CAPACITY IN A VIRTUALIZED NETWORK

This application claims the benefit of U.S. Provisional Application No. 62/011,484, filed on Jun. 12, 2014, entitled "Methods and Systems for Network Function Virtualization (NFV) Capacity Indication in NFV Deployment Flavor Descriptor," which application is hereby incorporated herein by reference

TECHNICAL FIELD

The present disclosure relates to methods and systems for network function virtualization. More specifically, the present disclosure relates to capacity management in a virtualized network.

BACKGROUND

Network Functions Virtualization (NFV) is the principle of separating network functions from the hardware they run on through virtual hardware abstraction, and is the focus of an industry effort to virtualize network equipment using generic hardware platforms for the purpose of reducing cost, improving operation efficiency, and enabling new service adaptability (See Network Functions Virtualization (NFV); Infrastructure Overview, ETSI GS NFV-INF 001 V1.1.1 (2015-01), http://www.etsi.org/deliver/etsi_gs/NFV-INF/001_099/001/01.01.01_60/gs_NFV-INF001v010101p.pdf, which is hereby incorporated into this application in its entirety).

Run-time instantiations of the virtual network functions (VNFs) (referred to as "VNF instances") are created by completing the instantiation of the VNF software on a NVF host, as well as by establishing connectivity between the VNF instances. This can be accomplished using the VNF deployment and operational information captured during VNF deployment, as well as additional run-time instance-specific information and constraints. Each of the VNF instances requires a designation of the capacity required for that instance. It is desirable that the capacity utilization of all of the VNFs on a particular hardware platform uses the capacity of that hardware platform efficiently.

SUMMARY OF THE DISCLOSURE

An embodiment of the disclosure includes a method including providing a network function virtualization (NFV) capacity for a plurality of virtual network functions (VNFs) on a computing platform. A network function virtualization management function creates at least one VNF to operate on the computing platform to perform a network function. Each of the VNFs has a definition comprising a plurality of parameters. At least one of the parameters is a capacity indication relative to a capacity of the network function for the respective VNF.

An additional embodiment of the disclosure includes a computing platform including at least one computing device providing a network function virtualization (NFV) capacity for a plurality of virtual network function (VNF) instances on the computing platform. At least one VNF is created by a network function virtualization management function to operate on the computing platform to perform a network function. Each of the VNFs has a definition comprising a plurality of parameters, wherein at least one of the parameters is a capacity indication relative to a capacity of the network function for the respective VNF.

An additional embodiment of the disclosure is an apparatus including a processor and a non-transitory computer readable storage medium storing programming for execution by the processor. The programming includes instructions to provide a network function virtualization (NFV) capacity for a plurality of virtual network functions (VNFs) on a computing platform and create, by a network function virtualization management function, at least one VNF to operate on the computing platform to perform a network function. Each of the VNFs has a definition comprising a plurality of parameters, wherein at least one of the parameters is a capacity indication relative to a capacity of the network function for the respective VNF.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presented embodiments are discussed in detail below. It should be appreciated, however, that the present invention provides many applicable inventive concepts that can be embodied in a wide variety of specific contexts. The specific embodiments discussed herein are merely illustrative of specific ways to make and use the invention, and do not limit the scope of the invention.

Figure 1:
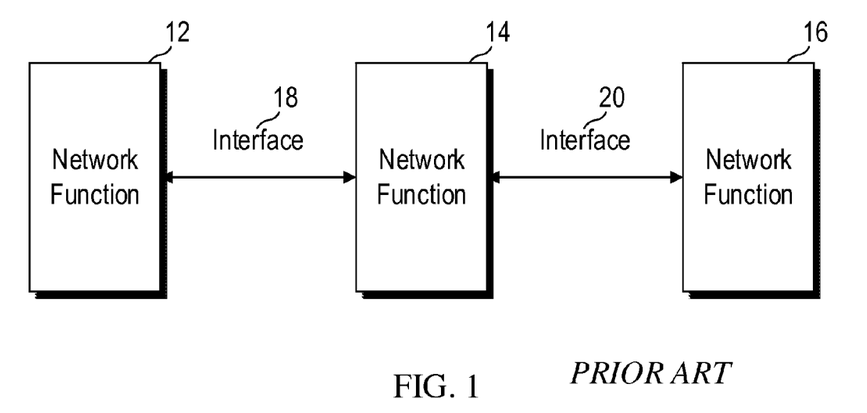
FIG. 1 illustrates a simple functional network.

Complex networks are commonly organized as functional blocks connected by defined interfaces. A simple example is illustrated in FIG. 1. Network 10 includes functional blocks 12, 14 and 16. Each function defines a state and transfer function that defines how the function will behave with regard to inputs received and outputs provided. The inputs received and the outputs provided are defined by interfaces 18 and 20. Each function is relatively autonomous within its definition. Organizing complex networks, such as telecommunications networks, is challenging because it is necessary to incorporate rapidly evolving technology and to accommodate rapid network growth while maintaining high reliability. The functional block scheme has been an effective tool in managing such complex networks because it allows for replacing, repairing, upgrading or adding functions with minimal disruption to the rest of the network. However, most functions operate on hardware devoted to that function. This makes some aspects of functional design more difficult. For example, scaling is more difficult because changing or adding to a function often involves adding or upgrading the hardware. This may involve considerable cost in a far flung network, like a telecommunications network.

Figure 2:
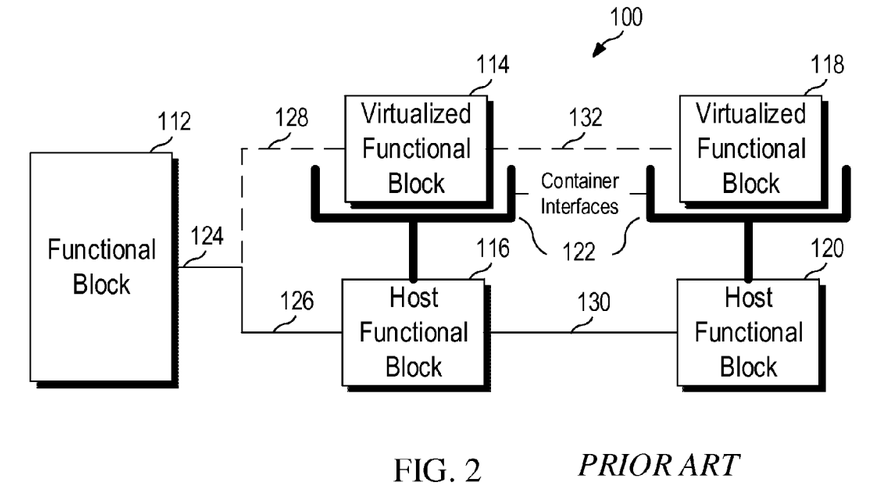
FIG. 2 illustrates an implementation of the functional network of FIG. 1 using network virtualization.

These issues have led to the development of virtual network functions. FIG. 2 is an illustration of implementing network 10 with Network Functions Virtualization (NVF). Network 100 includes traditional blocks such as functional block 112. Interface 124 communicates with both virtual interface 128 and host interface 126. Virtual functional block 114 is created by a software module with a specific design. The state and function of a traditional network block, such as block 14 of FIG. 1, are coded into virtualized functional block 114 and loaded into an operating system including container interfaces 122. Container interface 122 defines how virtual functional block 114 and its interface functions are loaded onto and supported by host functional block 116. From the standpoint of the operation of the network, there is no difference in the operation of virtualized functional block 114 and functional block 14 of FIG. 1. Similarly, virtual interface 132 and host interface 130 communicate with virtualized functional block 118 and host functional block 120, which define the function of Network function 16 (FIG. 1) using container interface 122.

Although host functional blocks 116 and 120 are shown as separated elements in FIG. 2, they are not necessarily separate machines. The host functional blocks are composed of computing resources (processing, storage, communication, etc.) provided in a pool of resources. The functional blocks are a portion of that pool of resources as defined by the parameters specified in virtual functional blocks 114 and 118. This allows the network operator to flexibly deploy network services as needed. For example, a subscriber (e.g. a cellphone network subscriber) may choose among several available services, such as voice mail transcription. Some subscribers may choose this option and some may not. If a subscriber chooses to subscribe to this service, a virtual functional block may be deployed to provide that service. At an additional level of sophistication, the virtual functional block may only be deployed when needed. In non-virtualized networks, machines and software to run those machines must be available to provide the necessary services. This requires additional unused capacity to ensure the availability of the services, which is expensive. On the other hand, a misjudgment regarding the need for reserve capacity can lead to service outages.

A virtualized network allows the network operator to use the available capacity for nearly all network services. Additional marginal capacity is still necessary. However, the various functions of the network are deployed on to a pool of resources, it is not necessary to have marginal capacity available for every function. Therefore, the additional capacity of a virtualized network can be much smaller than the combined additional capacity necessary for all of the functions of a non-virtualized network.

Figure 3:
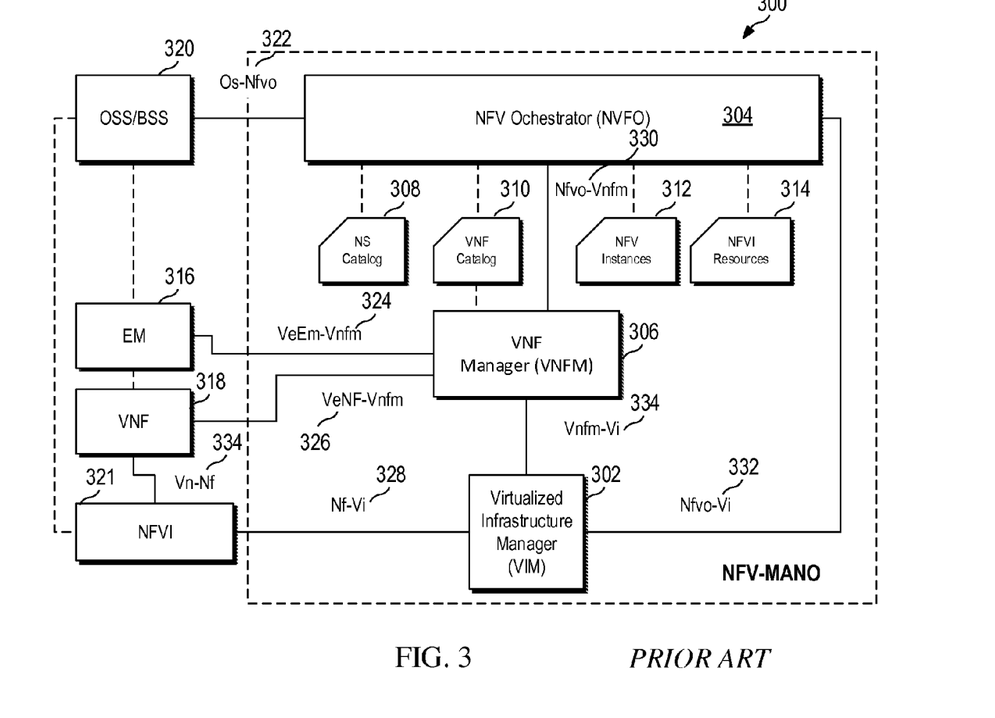
FIG. 3 illustrates a functional diagram of a platform suitable for network virtualization.

However, to effectively deploy a virtualized network requires a sophisticated function management system. One such system is described in Network Functions Virtualization (NVF): Management and Orchestration (NFV-MAN), ETSI NFV-MAN 001 v1.1.1 (2014-12), http://www.etsi.org/deliver/etsi_gs/NFV-MAN/001_099/001/01.01.01_60/gs_NFV-MAN001v010101p.pdf, which is hereby incorporated into this application in its entirety by reference. (Note: the NVF-MAN and other ETSI documents use the British spelling of "virtualisation" with an "s." This application uses the American spelling of "virtualization" with a "z.') The Network Functions Virtualization: Management and Orchestration (NFV-MANO) architectural framework 300 identifies the following NFV-MANO functional blocks as shown in FIG. 3:

Virtualized Infrastructure Manager (VIM) 302;
NFV Orchestrator (NFVO) 304; and
VNF Manager (VNFM) 306.

NFV-MANO architectural framework identifies the following data repositories:

Network Service (NS) Catalogue 308;
Virtualized Network Function (VNF) Catalogue 310;
Network Functions Virtualization (NFV) Instances repository 312; and
Network Functions Virtualization Infrastructure (NFVI) Resources repository 314.

The NFV-MANO architectural framework identifies the following functional blocks that share reference points with NFV-MANO:

Element Management (EM) 316;
Virtualized Network Function (VNF) 318;
Operation System Support (OSS) and Business System Support functions (BSS) 320; and
NFV Infrastructure (NFVI) 321.

The NFV-MANO architectural framework identifies the following main reference points:

Os-Nfvo, a reference point between OSS/BSS and NFVO 322;
VeEm-Vnfm, a reference point between EM and VNFM 324;
VeNF-Vnfm, a reference point between VNF and VNFM 326;
Nf-Vi, a reference point between NFVI and VIM 328;
Nfvo-Vnfm, a reference point between NFVO and VNFM 330;
Nfvo-Vi, a reference point between NFVO and VIM 332; and
Vn-Vi, a reference point between VIM and VNFM 334.

The container interfaces 122 (FIG. 2) require specification of every resource in the NVF-MANO 300 that are necessary for the operation of the virtual function established through the container interface 122 (e.g. virtualized function blocks 114 and 118). These specifications are explained in detail in Chapters 6 and 7 of NVF-MAN, which encompasses over fifty pages of that document. For purposes of this disclosure, it is only necessary to discuss in further detail the Constituent Virtualized Network Function (CVNF) described in 6.2.1.3.2 of NVF-MAN.

Figure 4:
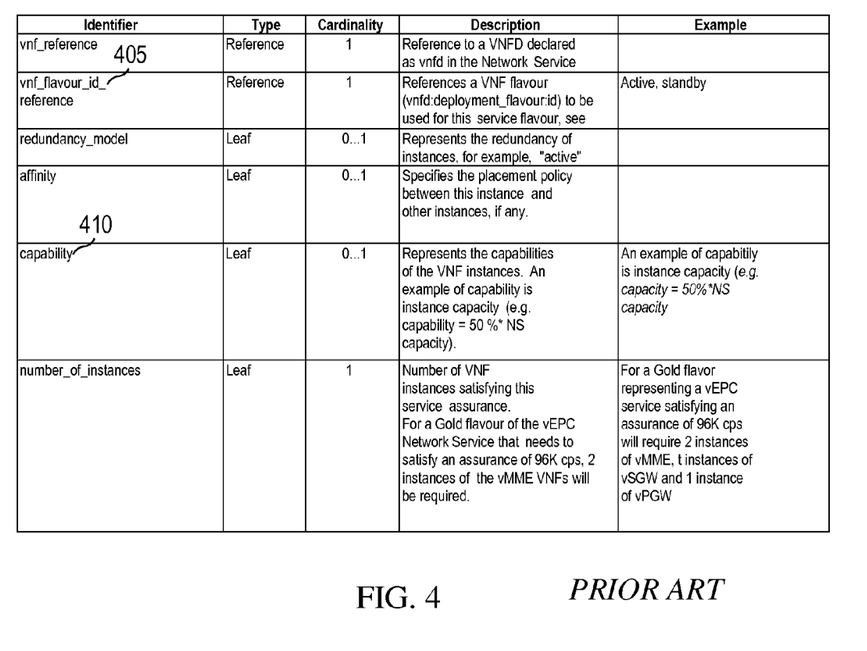
FIG. 4 illustrates a table of identifiers that may be included in an NFV capacity indicator set.

FIG. 4 is a copy of the CVNF as shown on page 43 of NVF-MAN. Capability identifier 410 designates the amount of network services (i.e. the size and capability of host functional block 116 or 120, FIG. 2) that can be met by a virtual function (i.e. virtualized functional block 114 or 118, FIG. 2) for a type of network service. For example, if a virtual network function flavor has a 50% network service capability rating, the at least two of instances of this flavor of VNF must be deployed to deploy the service. ("flavor" is spelled "flavour" in these charts as per the common spelling in England). A flavor is essentially a template of key parameters that are used in common virtual functions. The purpose of the flavors is to provide a starting point for VNF deployment (VNFD).

Figure 5:
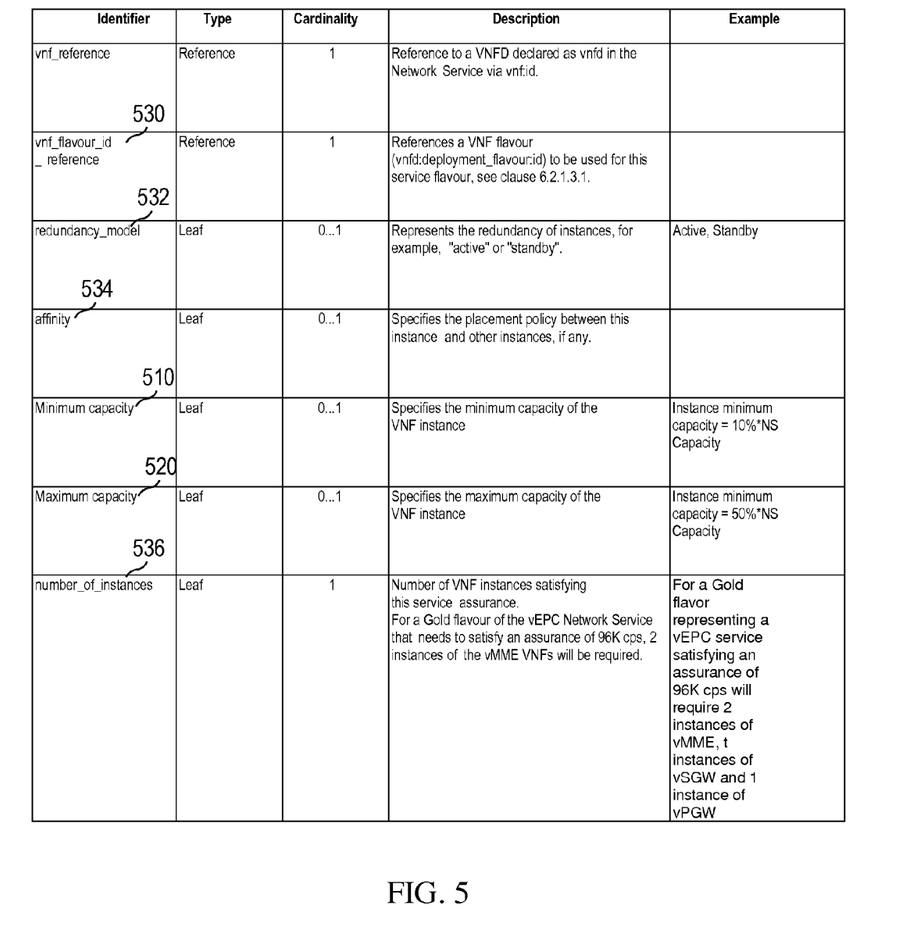
FIG. 5 illustrates a table of identifiers that may be included in an NFV capacity indicator set in accordance with an embodiment of the disclosure.

FIG. 5 shows an example of an embodiment of the disclosure. Rather than specify a capacity as in FIG. 4, the template of FIG. 5 includes two entries: minimum capacity 510 and maximum capacity 520. In another embodiment, and average capacity is included. These factors are entered in relative terms, in this example, in terms of a percentage of a network service (NS) capacity. The network service capacity is the total capacity of the network service being deployed. The network service capacity can refer to some quantity measurement, such as throughput, number of users that can be supported or how many of certain applications can be supported (i.e. voice channels). The VNF is defined as a percentage of the network service capacity. For example, if a VNF flavor has a minimum service capacity of 20% and a maximum service capacity of 50%, then this service can be deployed with between two (2×50%=100%) to five (5×20%=100%) VNF instances. The VNF provider provides these indicators as its VNF capacity parameter within its VNF packages, such as in the VNFD. This allows the NVF-MANO flexibility in meeting the requirements of a network service in order to configure the host functional blocks (e.g., host functional blocks 116 and 120) in the most efficient manner vis-à-vis the available resources. The VNF-MANO functions will use these indications to select the suitable VNF and the number of VNFs to create a desired service which has capacity requirement or flavor.

In addition to the entries described above, the embodiment of FIG. 5 includes a VNF flavor reference 530 to identify a specific type of virtual machine. A redundancy model 532 indicates whether a concurrent back-up of the VNF is needed and its character. An affinity designation 534 specifies the relationship with other instances of the VNF. Finally, a number of instances entry 536 specifies the number of instances needed for a quality of service.

Figure 6:
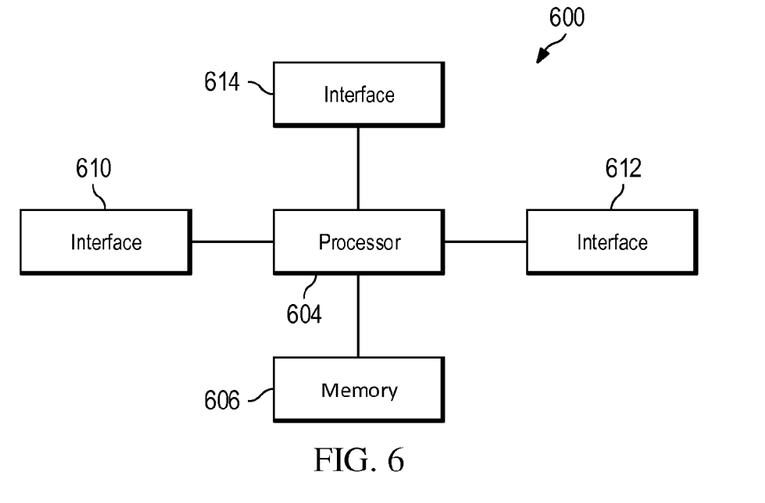
FIG. 6 illustrates a computing platform that may be used for implementing, for example, the devices and methods described herein, in accordance with an embodiment.

FIG. 6 illustrates a block diagram of an embodiment processing system 600 for performing methods described herein, which may serve as a host device. As shown, the processing system 600 includes a processor 604, a memory 606, and interfaces 610-614, which may (or may not) be arranged as shown in FIG. 6. The processor 604 may be any component or collection of components adapted to perform computations and/or other processing related tasks. In a virtualized network, processor 604 may consist of thousands or processing devices, such as so-called "blade" computers. Memory 606 may be any component or collection of components adapted to store programming and/or instructions for execution by the processor 604. In an embodiment, the memory 606 includes a non-transitory computer readable medium. The interfaces 610, 612, 614 may be any component or collection of components that allow the processing system 600 to communicate with other devices/components and/or a user. For example, one or more of the interfaces 610, 612, 614 may be adapted to communicate data, control, or management messages from the processor 604 to applications installed on the host device and/or a remote device. As another example, one or more of the interfaces 610, 612, 614 may be adapted to allow a user or user device (e.g., personal computer (PC), etc.) to interact/communicate with the processing system 600. The processing system 600 may include additional components not depicted in FIG. 6, such as long term storage (e.g., non-volatile memory, etc.).

In some embodiments, the processing system 600 is included in a network device that is accessing, or part otherwise of, a telecommunications network. In one example, the processing system 600 is in a network-side device in a wireless or wireline telecommunications network, such as a base station, a relay station, a scheduler, a controller, a gateway, a router, an applications server, or any other device in the telecommunications network. In other embodiments, the processing system 600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 7:
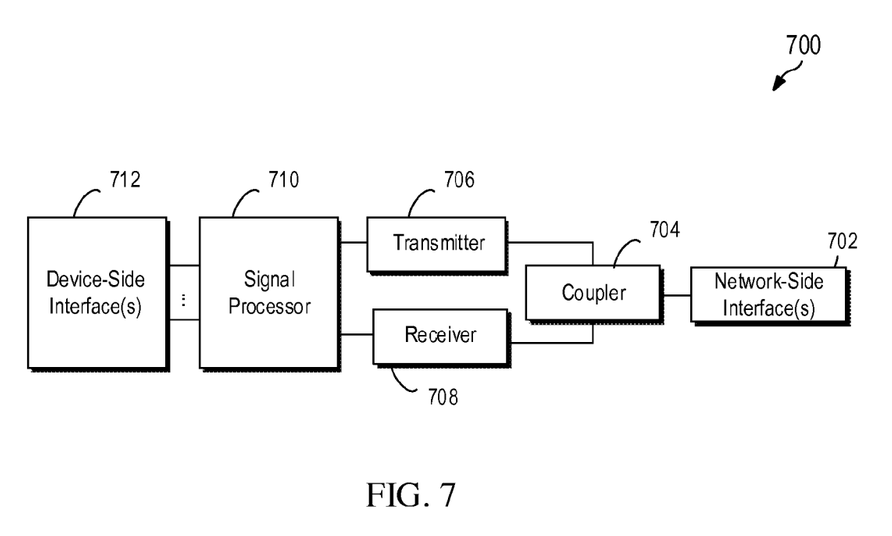
FIG. 7 illustrates a telecommunications system, in which one or more of the embodiments of the disclosure may be implanted.

In some embodiments, one or more of the interfaces 610, 612, 614 connects the processing system 600 to a transceiver adapted to transmit and receive signaling over the telecommunications network. FIG. 7 illustrates a block diagram of a transceiver 700 adapted to transmit and receive signaling over a telecommunications network. The transceiver 700 may be installed in a host device and some or all of its components may be virtualized. As shown, the transceiver 700 comprises a network-side interface 702, a coupler 704, a transmitter 706, a receiver 708, a signal processor 710, and a device-side interface 712. The network-side interface 702 may include any component or collection of components adapted to transmit or receive signaling over a wireless or wireline telecommunications network. The coupler 704 may include any component or collection of components adapted to facilitate bi-directional communication over the network-side interface 702. The transmitter 706 may include any component or collection of components (e.g., up-converter, power amplifier, etc.) adapted to convert a baseband signal into a modulated carrier signal suitable for transmission over the network-side interface 702. The receiver 708 may include any component or collection of components (e.g., down-converter, low noise amplifier, etc.) adapted to convert a carrier signal received over the network-side interface 702 into a baseband signal. The signal processor 710 may include any component or collection of components adapted to convert a baseband signal into a data signal suitable for communication over the device-side interface(s) 712, or vice-versa. The device-side interface(s) 712 may include any component or collection of components adapted to communicate data-signals between the signal processor 710 and components within the host device (e.g., the processing system 600, local area network (LAN) ports, etc.).

The transceiver 700 may transmit and receive signaling over any type of communications medium. In some embodiments, the transceiver 700 transmits and receives signaling over a wireless medium. For example, the transceiver 700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 702 comprises one or more antenna/radiating elements. For example, the network-side interface 702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
providing a network function virtualization (NFV) capacity for a plurality of virtual network functions (VNFs) on a computing platform;
creating, by an NFV management function in an NFV management and orchestration (NFV MANO), at least one VNF to operate on the computing platform to perform a network function, wherein each of the VNFs has a definition comprising a plurality of parameters, and wherein at least two of the parameters are capacity indications relative to a capacity of a network service for which the respective VNF is created; and
using, by the NFV MANO, the capacity indications to select suitable VNFs and a suitable number of VNFs from a plurality of candidate VNFs to support a desired service that requires a functionality of the VNFs but also has a capacity requirement.

2. The method of claim 1, wherein the capacity indications define maximum and minimum capacity requirements for the respective VNF.

3. The method of claim 1, wherein the capacity indications indicate a percentage of the capacity of the network service compared to a total capacity of the network service of which the VNF is part.

4. The method of claim 1, wherein the capacity indications are configured to be used by NFV management functions for service and resource orchestration and management.

5. The method of claim 4, wherein NFV management functions for service and resource orchestration and management is one or both of an NFV orchestrator (NFVO) and VNF manager (VNFM).

6. The method of claim 1, wherein the parameters comprise:
a virtual machine specification;
a storage requirement;
a redundancy model definition; and
a number of instances of the VNF.

7. The method of claim 1, wherein the capacity indications are configured to be used by NFV management functions for composing a deployment flavor.

8. The method of claim 1, wherein the capacity indications are provided by a VNF provider as part of a VNF package that is included in a virtual network function descriptor (VNFD).

9. The method of claim 1, wherein the capacity indications are used as a record to indicate a run time capacity of a VNF instance that is in an operation state.

10. The method of claim 1, wherein the NFV capacity is a quantity measurement.

11. The method of claim 10, wherein the quantity measurement is one or more of a throughput, a number of users to be supported, and a number of applications that can be supported.

12. A computing platform comprising:
at least one computing device providing a network function virtualization (NFV) capacity for a plurality of virtual network function (VNF) instances on the computing platform; and
at least one VNF created by an NFV management function to operate on the computing platform to perform a network service, wherein each of the VNFs has a definition comprising a plurality of parameters, and wherein at least two of the parameters are capacity indications relative to a capacity of the network service for the respective VNF; and
an NFV management and orchestration (NFV MANO), comprising the NFV management function, the NFV MANO using the capacity indications to select suitable VNFs and a suitable number of VNFs from a plurality of candidate VNFs to support a desired service that requires a functionality of the VNFs but also has a capacity requirement.

13. The computing platform of claim 12, wherein the capacity indications define maximum and minimum capacity requirements for the respective VNF.

14. The computing platform of claim 12, wherein the capacity indications are configured to be used by NFV management functions for service and resource orchestration and management.

15. The computing platform of claim 14, wherein NFV management functions for service and resource orchestration and management is one or both of an NFV orchestrator (NFVO) and VNF manager (VNFM).

16. The computing platform of claim 12, wherein the capacity indications are configured to be used by NFV management functions for composing a deployment flavor.

17. The computing platform of claim 12, wherein the capacity indications are provided by a VNF provider as part of a VNF package that is included in a virtual network function descriptor (VNFD).

18. The computing platform of claim 12, wherein the capacity indications are used as record to indicate a run time capacity of a VNF instance which is in an operation state.

19. The computing platform of claim 12, wherein the NFV capacity is a quantity measurement.

20. The computing platform of claim 19, wherein the quantity measurement is one or more of a throughput, a number of users to be supported, and a number of applications that can be supported.

21. The computing platform of claim 12, wherein the parameters comprise:
a virtual machine specification;
a storage requirement;
a redundancy model definition; and
a number of instances of the VNF.

22. An apparatus comprising:
a processor; and
a non-transitory computer readable storage medium storing programming for execution by the processor, the programming including instructions to:
provide a network function virtualization (NFV) capacity for a plurality of virtual network functions (VNFs) on a computing platform;
create, by an NFV management function in an NFV management and orchestration (NFV MANO), at least one VNF to operate on the computing platform to perform a network service, wherein each of the VNFs has a definition comprising a plurality of parameters, wherein at least two of the parameters are capacity indications relative to a capacity of the network service for the respective VNF; and
use, by the NFV MANO, the capacity indications to select suitable VNFs and a suitable number of VNFs from a plurality of candidate VNFs to support a desired service that requires a functionality of the VNFs but also has a capacity requirement.

23. The apparatus of claim 22, wherein the capacity indications define maximum and minimum capacity requirements for the respective VNF.

24. The apparatus of claim 22, wherein the capacity indications indicate a percentage of the capacity of the network service.

25. The apparatus of claim 22, wherein the capacity indications are configured to be used by NFV management functions for service and resource orchestration and management.

26. The apparatus of claim 25, wherein NFV management functions for service and resource orchestration and management is one or both of an NFV orchestrator (NFVO) and VNF manager (VNFM).

27. The apparatus of claim 22, wherein the capacity indications are a percentage of the capacity of the network service.

28. The apparatus of claim 22, wherein the capacity indications are configured to be used by NFV management functions for composing a deployment flavor.

29. The apparatus of claim 22, wherein the capacity indications are provided by a VNF provider as part of a VNF package that is included in a virtual network function descriptor (VNFD).

30. The apparatus of claim 22, wherein the capacity indications are used as record to indicate a run time capacity of a VNF instance which is in an operation state.

31. The apparatus of claim 22, wherein the NFV capacity is a quantity measurement.

32. The apparatus of claim 31, wherein the quantity measurement is one or more of a throughput, a number of users to be supported, and a number of applications that can be supported.

* * * * *